Oct. 15, 1940.　　　　G. S. SCHAIRER　　　　2,217,969
UNIVERSAL JOINT
Filed March 8, 1937　　　　4 Sheets-Sheet 1

INVENTOR
GEO. S. SCHAIRER
BY
ATTORNEY

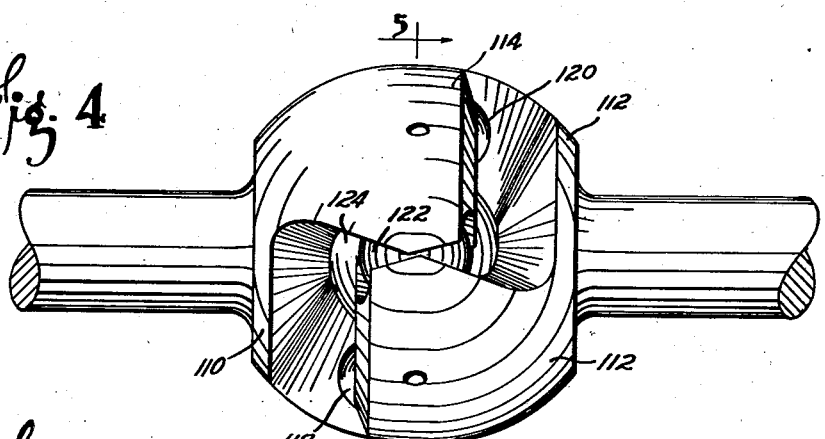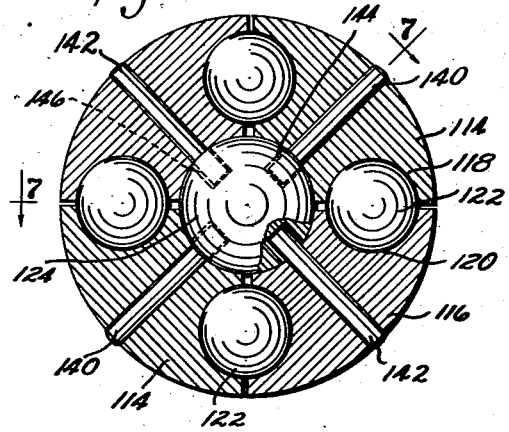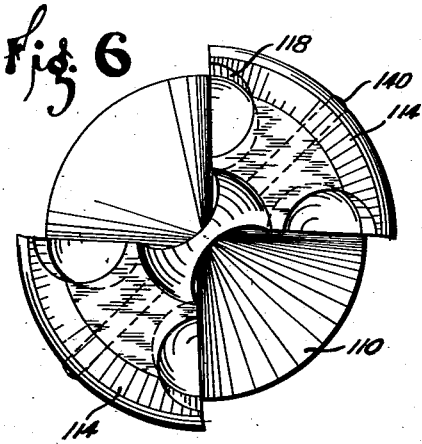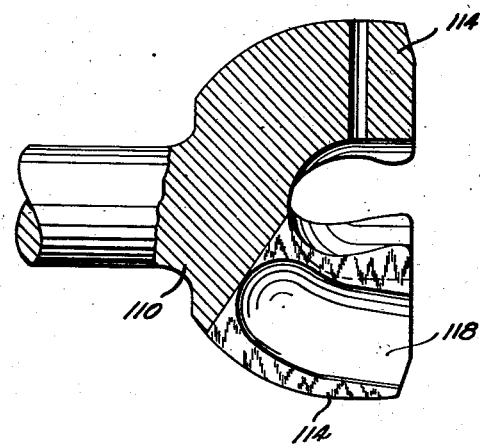

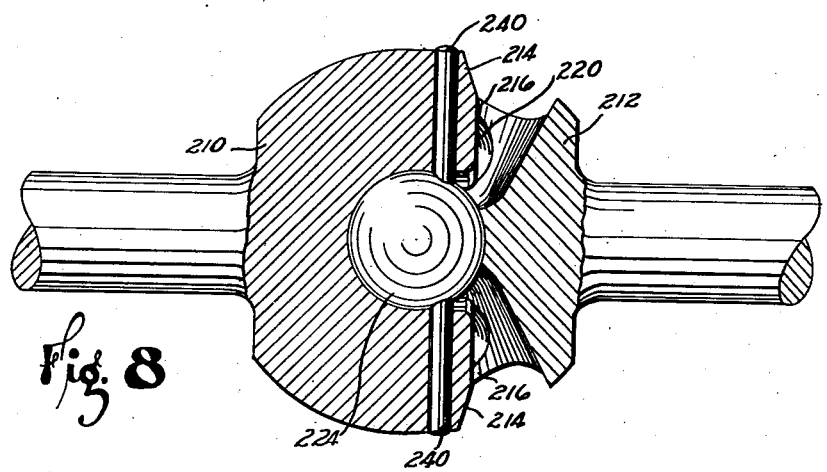
Fig. 8
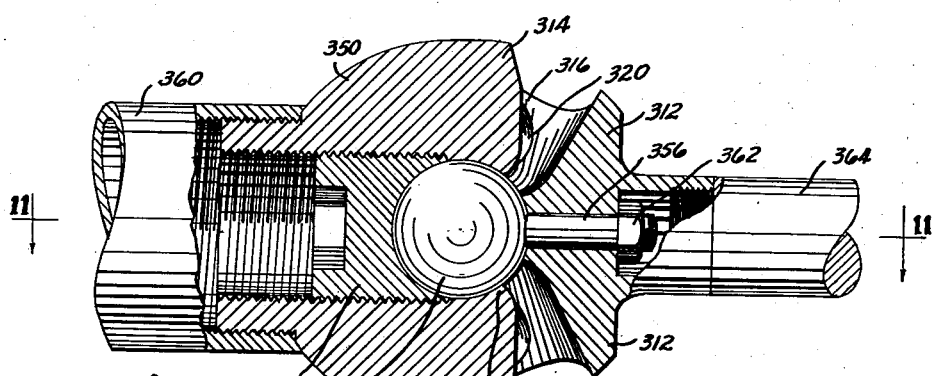
Fig. 9
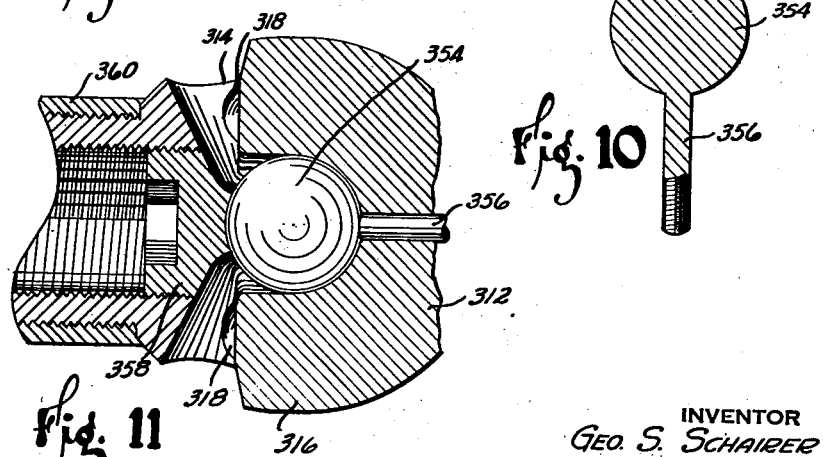
Fig. 10
Fig. 11

Oct. 15, 1940.     G. S. SCHAIRER     2,217,969
UNIVERSAL JOINT
Filed March 8, 1937     4 Sheets-Sheet 4

INVENTOR
GEO. S. SCHAIRER
BY
A. E. Wilson
ATTORNEY

Patented Oct. 15, 1940

2,217,969

UNITED STATES PATENT OFFICE 2,217,969

UNIVERSAL JOINT

George S. Schairer, South Bend, Ind., assignor to Bendix Products Corporation, South Bend, Ind., a corporation of Indiana Application March 8, 1937, Serial No. 129,540

8 Claims. (Cl. 64—9)

This invention relates to universal joints, and more particularly to means for holding constant angle velocity joints together.

It has been found difficult to design constant angle velocity joints, wherein torque is transmitted through anti-friction means positioned in cooperating raceways carried by the joint members, in such a manner that the joint may be subjected to tension or end thrust. The anti-friction means roll in the cooperating raceways and move to a position to bisect the angle between the joint members. It is necessary that the anti-friction means be free to move in order that the joint may bisect the angle between the interconnected shafts and transmit torque at constant angle velocity.

An object of this invention is therefore to provide means to hold a universal joint in assembled relation.

A further object is to provide means positioned within the joint to hold the joint together and permit the joint to be operated under tension or end thrust.

A still further object is to provide an apertured center ball positioned intermediate cooperating joint members to receive restraining means engaging the joint members to permit the joint to be operated under tension.

Yet another object of the invention is to provide a locking device for a universal joint comprising a ball member partly received in each of two cooperating joint members to prevent the joint from becoming disassembled when subjected to tension.

Another object is to lock a pair of cooperating joint members together by means of a central ball member received in one of the joint members and bolted or otherwise fixed to the other joint member.

A still further object of the invention is to provide means to yieldingly hold a universal joint member together.

A further object is to provide wedging means engaging a centrally disposed member to hold a constant angle velocity universal joint member together.

Yet a still further object of the invention is to provide transversely disposed cooperating grooves in each of a pair of joint body members to engage a member positioned in the cooperating grooves to lock the joint in assembled relation.

Other objects and advantages of this invention will be apparent from the following detailed description, considered in connection with the accompanying drawings submitted for purposes of illustration only, and not intended to define the scope of the invention, reference being had for that purpose to the subjoined claims.

In the drawings wherein similar reference characters refer to similar parts throughout the several views:

Figure 4 is a side elevation of a universal joint member embodying a modified form of the invention;

Figure 5 is a sectional view taken on the line 5—5 of Figure 4;

Figure 6 is an end elevation of one of the joint members shown in Figure 4;

Figure 7 is a view taken on the line 7—7 of Figure 5;

Figure 8 is a sectional view illustrating a further modified form of the invention;

Figure 9 is a longitudinal sectional view of another embodiment of the invention;

Figure 10 is a sectional view of the locking means illustrated in Figure 9;

Figure 11 is a view taken on the line 11—11 of Figure 9;

Figure 1:
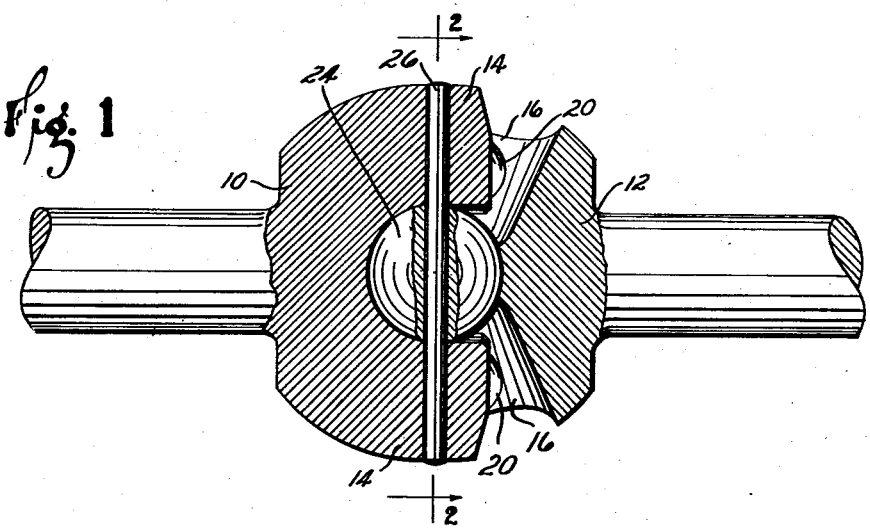
Figure 1 is a vertical section through a constant angular velocity universal joint embodying the present invention.
Figure 2:
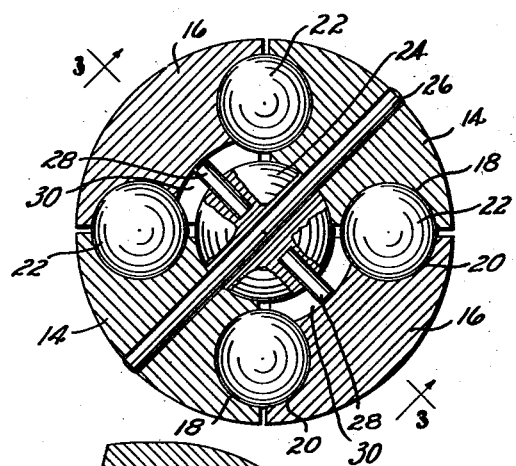
Figure 2 is a sectional view taken on the line 2—2 of Figure 1.
Figure 3:
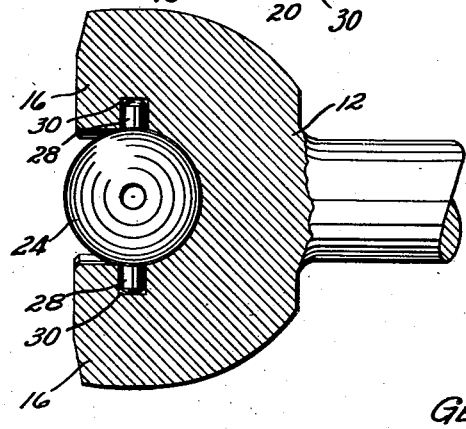
Figure 3 is a sectional view taken on the line 3—3 of Figure 2.

Referring more particularly to Figures 1 to 3 there is shown, for purposes of illustrating this invention, a universal joint of the constant angular velocity type having body members 10 and 12. Each of the body members 10 and 12 is provided with a plurality of spaced arms 14 and 16 respectively. Each of the arms 14 and 16 has longitudinally extending cooperating raceway segments 18 and 20 formed in their side walls. The cooperating raceway segments 18 and 20 receive anti-friction driving means, such as balls 22 which are free to roll in the raceways to bisect the angle between the joint members 10 and 12 to transmit torque at constant angle velocity.

In this embodiment of the invention the joint members 10 and 12 are held in assembled relation in such a manner that the joint may be subjected to end thrust or tension while in operation. A centrally disposed apertured ball member 24 is interposed between the body members 10 and 12. A pin or rod 26 extends through the arms 14 of the joint member 10 and the ball member 24 to hold the ball member in proper relation with reference to the body member 10. Auxiliary locking pins or rods 28 are received in oppositely disposed apertures in the ball member 24, and extended into circular recesses 30 formed in the arms 16 of the body member 12 to hold the ball 24 in proper relation with reference to the body member 12.

In the operation of this embodiment of the invention, the pin 26 extending through the ball 24 will permit the body member 12 to be angularly displaced with reference to the body member 10 without interfering with the driving balls 22, which roll in the cooperating raceways 18 and 20 to bisect the angle between the joint members 10 and 12. The pins 28 engaged in the circular recesses 30 formed in the body member 12 are free to move radially therein to permit angular displacement between the body members 10 and 12 without interfering with the torque transmitting driving means referred to above.

The apertures in the ball 24 may be slightly larger than the pins 26 and 28 to compensate for slight misalignment of the parts, thereby rendering it unnecessary to hold the parts to close tolerances. It will be observed that the body members are thus held together by means of a simple and inexpensive device whereby the joint may be operated under tension.

The embodiment of the invention illustrated in Figures 4 to 7 is similar in many respects to that illustrated in Figures 1 to 3, corresponding parts having therefore been given corresponding reference numerals with the addition of 100. In this embodiment of the invention a plurality of pins or rods 140 and 142 project through the spaced arms 114 and 116 respectively, and are received in apertures 144 and 146 in the central ball 124. The apertures 144 and 146 are preferably larger than the pins to compensate for slight misalignment of the parts. The operation of this embodiment is substantially similar to the operation of the embodiment illustrated in Figures 1 to 3. It will be understood of course that any desired means may be employed to fix the pins 140 and 142 in the spaced arms 114 and 116 respectively.

The embodiment illustrated in Figure 8 is similar in many respects to the embodiment illustrated in Figures 4 to 7, corresponding parts having therefore also been given corresponding reference numerals with the further addition of 100. It will be observed that in this embodiment that the pins 240 do not extend into apertures in the central ball 224 but rather project through the arms 214 at a point forwardly of the center of the ball 224, and hold it in proper relation to the body member 210 by means of a wedging action. Pins 242 carried by the arms 216 of the body member 212 project through the arms 216, and engage the ball 224 in a similar manner, and thus hold the ball 224 in proper relation to the body member 212. The joint members 210 and 212 are thus held in proper relation whereby tension may be transmitted through the joint.

In the embodiment of the invention illustrated in Figures 9 to 11, the arms 314 are carried by a hollow threaded member 350. The forward central section of the member 350 is contracted as illustrated at 352, and is of rounded section to receive a centrally disposed ball 354 having a projection 356 carried thereby. A plug member 358 is threaded into the member 350 and engages the ball 354 to prevent it from becoming displaced from the member 350. A shaft member 360 may be threaded or otherwise secured to the member 350. The projection 356 carried by the ball 354 projects through the body member 312 as illustrated and is fixed thereto by means of a nut 362 threaded on the end of the projection 356. A shaft 364 may be threaded or otherwise secured to a body member 312.

It will be observed that in this embodiment of the invention the central ball 354 is inserted through the member 350, and is of a diameter such as to prevent it from passing through beyond the arms 314, and that the projection 356 carried by the ball is fixed with reference to the body member 312. The ball 354 moves in the socket in which it is seated, thereby permitting freedom of movement between the body members whereupon the joint may transmit torque at uniform angular velocity while subjected to tension or end load.

It will be observed in Figure 11 that the plug member 358 is shaped in such a manner as not to interfere with the arms 316 of the body member 312 when the joint is deflected. It will be understood that the projection 356 may be threaded into the central ball 354, or may be fixed thereto in any desired manner.

If desired the plug 358 may be slidably received within the member 350, means being provided to maintain the plug 358 in proper alignment with reference to the member 350 so as not to interfere with the arms 316 of the body member 312. Yielding means may be provided to urge the plug 358 into engagement with the ball 354, whereby a limited longitudinal movement between the joint body members may be provided. In the embodiment illustrated sufficient clearance is of course provided between the central ball 354 and the plug 358 to permit freedom of movement of the ball in its socket to avoid binding or cramping of the joint members.

Figure 12:
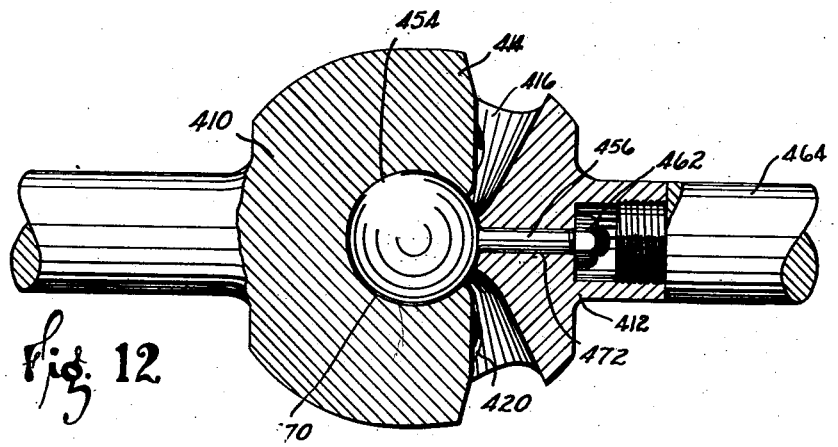
Figure 12 is a longitudinal section of a joint member embodying a further modified form of locking means.
Figure 14:
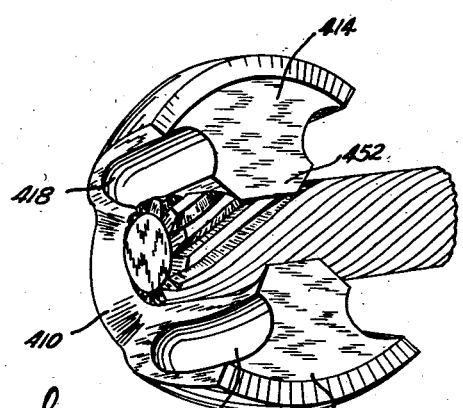
Figure 14 is a perspective view illustrating one step in the operation of forming a portion of the locking means illustrated in Figures 12 and 13.

In the embodiment of the invention illustrated in Figure 12, a central ball 454 having a projection 456 fixed thereto is received in a transversely extending groove 470 formed in the body member 410. Figure 14 illustrates a reaming operation in the formation of the transversely extending grooves 470 between the spaced arms 414 of the body member 410.

In this embodiment of the invention the ball 454 is positioned in the transversely extending groove 470, and the joint members assembled, the projection 456 being received in a centrally disposed aperture 472 in the body member 412, and fixed therein by means of the nut 462 which engages the end of the projection 456.

Figure 13:
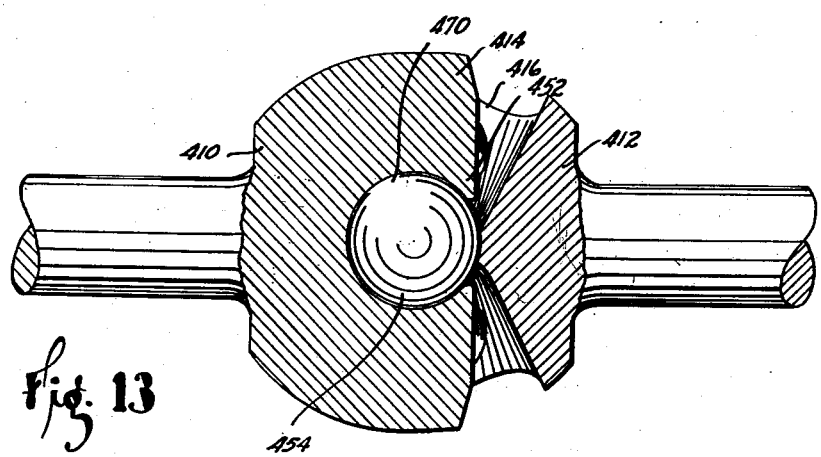
Figure 13 is a longitudinal sectional view illustrating a still further modified form.

In the embodiment illustrated in Figure 13, both of the joint members are formed with transversely extending grooves 470 which engage the central ball 454. In this embodiment, the joint is prevented from becoming disassembled by means of the contracted sections 452 which overlie the ball 454. The joint is of course prevented from becoming disassembled by means of the driving balls interposed in the cooperating raceways formed in the arms 414 and 416.

While the invention has been described with particular reference to a number of desirable embodiments, it is to be understood that the scope of the invention is not to be restricted by any of the features illustrated and described, as many changes may be made in the combinations of desirable features without departing from the spirit of this invention as defined by the following claims.

I claim:

1. In a constant angle velocity universal joint, a pair of cooperating body members having spaced interengaging arms, driving balls interposed between the interengaging arms to transmit torque from one body member to the other, a central ball interposed between the body members, and means engaging the arms and central ball to hold the joint in assembled relation.

2. In a constant angle velocity universal joint, a pair of cooperating body members having spaced arms, a central ball interposed between the body members, and means extending through the ball and some of the arms to hold the joint in assembled relation.

3. In a constant angle velocity universal joint, a pair of cooperating body members having spaced interengaging arms, driving balls positioned between the arms, a central ball interposed between the body members, and means including a pin extending through the central ball and the arms carried by one of the body members and a plurality of pins extending into the central ball and restrained against movement in one direction in the arms carried by the other body member.

4. In a constant angle velocity universal joint, a pair of body members having spaced cooperating arms, driving means interposed between the arms of the body members, means including a central ball interposed between the body members, and means engaging the central ball and the spaced arms to prevent the body members from separating.

5. In a constant angle velocity universal joint, a pair of body members having spaced cooperating arms, driving means interposed between the arms, means including a central ball interposed between the body members, and means including a link extending through one pair of spaced arms and the central ball and a pair of auxiliary links engaging the central ball and received in grooves in the other pair of spaced arms to prevent the body members from separating and to permit the joint to operate under tension.

6. In a universal joint adapted to transmit torque at constant angular velocity, a pair of body members having interengaging arms, driving means interposed between the interengaging arms, a ball interposed between the body members, and means including pins extending through the arms and engaging the surface of the ball to prevent the body members of the joint from separating.

7. In a constant angle velocity universal joint, a pair of body members having spaced cooperating arms, driving means interposed between the arms of the body members, central means interposed between the body members, and means engaging the central means and the body members to prevent said members from separating.

8. In a constant angle velocity universal joint, a pair of body members having spaced interengaging arms, driving means interposed between the arms of said body members, a locking member having recesses and interposed between said body members, and projecting means on said body member adapted to loosely engage the recesses of said locking member.

GEORGE S. SCHAIRER.